Sept. 26, 1967  H. E. SELLERS  3,343,736
TIRE CARRIER
Filed Jan. 11, 1966  2 Sheets-Sheet 1
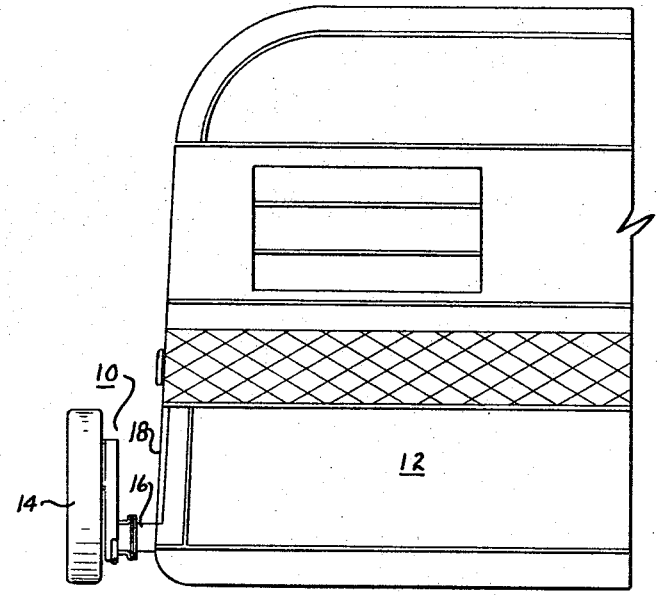
FIG. 1
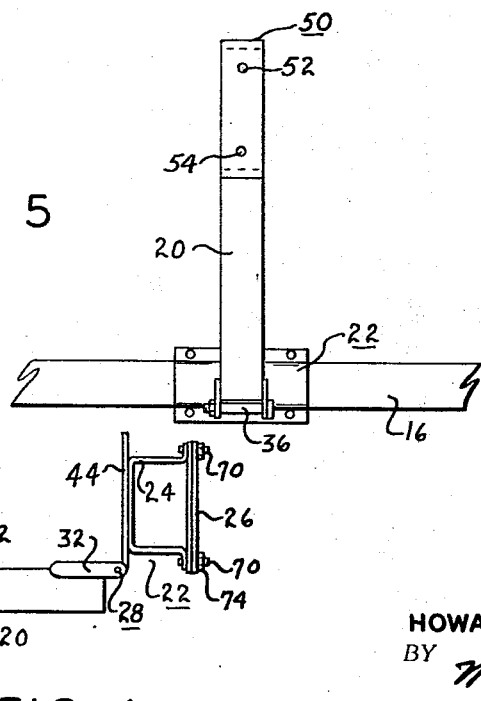
FIG. 5
FIG. 4
INVENTOR.
HOWARD E. SELLERS
BY M. A. Hobbs
ATTORNEY

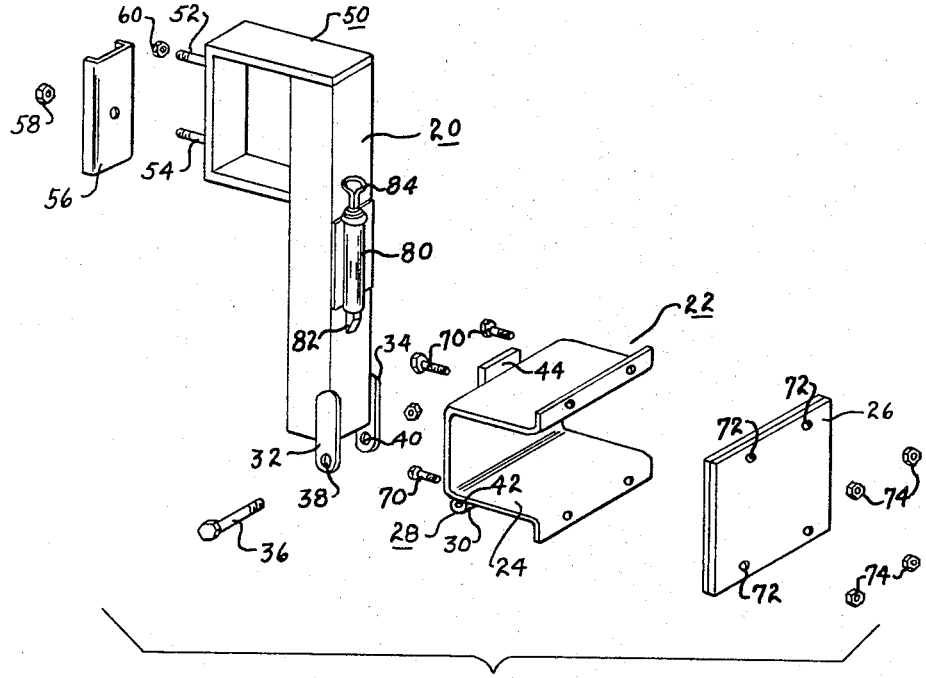

United States Patent Office 3,343,736
Patented Sept. 26, 1967

3,343,736
TIRE CARRIER
Howard E. Sellers, Syracuse, Ind.
(Wakarusa, Ind. 46573)
Filed Jan. 11, 1966, Ser. No. 521,485
1 Claim. (Cl. 224—42.06)

ABSTRACT OF THE DISCLOSURE

A spare tire carrier for a trailer consisting of a base mounted on the bumper and a tubular body pivoted to the base and pivotable from vertical to horizontal position. The tire is mounted on the rear side of the vertical pivotable body. The latch means is mounted on the rear side of the body, and engageable with a latching means on the base when the body is in its vertical position.

---

In order to conserve space in trailers and mobile homes, spare tires are conventionally carried externally, usually on the rear of the vehicle. Most of these vehicles have compartments for utilities, tools or supplies extending across the rear and having relatively large doors hinged to swing upwardly and downwardly and requiring substantial space to move the door between opened and closed positions. In the past, the spare tire carried on the rear had to be removed before the door could be opened and closed, to do so requiring the removal of several nuts or lugs and lifting the tire away from the vehicle. This mounting and demounting operation was not only often difficult and required the use of tools or other not readily available equipment, but was also inconvenient and time consuming and required the placing of the removed parts on the ground or pavement where they could readily become lost or left when the vehicle was moved. Further, this operation was more difficult and the possibility of losing parts increased when the ground or pavement was covered with snow, ice, slush, mud or other soft material. It is therefore one of the principal objects of the present invention to provide a spare tire carrier which can readily be moved between an upright position assumed while the vehicle is moving and a horizontal position assumed when the door or doors of the vehicle compartment are to be opened and closed, and which is held firmly and reliably in its upright position while the vehicle is traveling.

Since the tools for changing a tire are often kept in the rear compartment of the trailer or mobile home, and tools are often required to demount the tire from the carrier and change the tire, the conventional carrier interfered with the tire removal operation and the mounting of the tire from the carrier itself. It is therefore another object of the invention to provide a relatively simple, easily operated tire carrier for a vehicle which is adapted to be moved between two positions without the use of any tools and without demounting the tire from the carrier or the carrier from the vehicle, and which can be easily operated to release the tire from the carrier.

Still another object of the invention is to provide a relatively simple tire carrier which can be readily fabricated from standard materials and standard equipment and which can be easily installed on the vehicle and adapted to various types of vehicles without any substantial changes being required.

Additional objects and advantages of the invention will become apparent from the following description and accompanying drawings, wherein:

FIGURE 1 is a side elevational view of a portion of a trailer with the present tire carrier mounted thereon in the position assumed when the trailer is traveling;

FIGURE 2 is an exploded perspective view of the present tire carrier showing the various parts thereof;

FIGURE 3 is a side elevational view of the present tire carrier showing it in the traveling position with the tire removed therefrom;

FIGURE 4 is a side elevational view similar to that shown in FIGURE 3, but with the tire carrier in the position for opening the rear door of the trailer;

FIGURE 5 is a rear elevational view of the present tire carrier showing it mounted on the bumper of the trailer; and FIGURE 6 is a front elevational view of a portion of the tire carrier showing a tire mounted thereon.

Referring more specifically to the drawings, numeral 10 designates the present tire carrier mounted on a trailer 12 and having a wheel 13 and a tire 14 mounted thereon. The tire carrier is mounted on a bumper 16 of vehicle 12 and is shown in the position assumed when the trailer is traveling. The trailer or mobile home on which the present carrier is mounted may be of various types, the one shown being a mobile home and having a compartment in the rear thereof with a door 18 extending substantially across the entire rear end of the trailer above bumper 16. The construction and design of the trailer are not important to the present invention; however, the invention is designed primarily for use with a rear bumper and is intended to be held in upright position in front of a rear compartment door which normally could not be opened when a conventional tire carrier is used until the tire and/or carrier have been removed from the vehicle. The additional details of the vehicle or trailer will not be described herein.

The present tire carrier consists of an elongated body 20 of rectangular cross section, preferably of a square tubular construction, and a base 22 consisting essentially of a U-shaped bracket 24, securing plate 26 and pivot or hinge means 28 secured to the lower rear portion of bracket 24. The hinge means consists of sleeve 30 welded or other wise secured to the lower portion of bracket 24, two arms 32 and 34 welded or otherwise secured to the lower portion of body 20 and a bolt or pin 36 extending through holes 38 and 40 of members 32 and 34, respectively, and through hole 42 of sleeve 30. The sleeve is preferably formed as an integral part of a bar 44 which is welded or otherwise secured to the rear side of bracket 24 and extends from the top of the bracket downwardly to a point below the bottom thereof to provide an offset hinge arrangement which will be more fully described hereinafter.

The body is provided with a bracket 50 secured to the upper end thereof and containing two rearwardly extending bolts or studs 52 and 54 for extending through the wheel of the spare tire. The wheel is mounted on the two studs, and a plate 56 is assembled on stud 54 and held thereon against the opposite side of the wheel by a nut 58, and stud 52 extends through one of the bolt holes in the hub of the wheel, and nut 60 clamps the hub firmly in place against the bracket 50. Bracket 50 consists of upper and lower horizontal bars 62 and 64, the upper bar being welded to the top end of body 20 and bar 64 being welded at its inner end to the rear side wall of the body. The two bars are connected by a vertical bar 66 rigidly secured thereto by welding or other suitable means, thus completing a substantially square-shaped bracket for rigidly supporting studs 52 and 54 and, hence firmly holding the tire and wheel in place on the carrier. The rearwardly extending position of bracket 50 and the size thereof permit the hub to seat on bar 66 and the rim and tire to be positioned close to the rear side of body 20.

Most of the bumpers used on trailers and mobile homes consist of a large, square, tubular-like member of square cross section extending across the back of the vehicle. The bracket 24 is shaped to slip from the rear directly over and under the upper and lower sides of the bumper and to be held thereon by plate 26 and a plurality of bolts 70 extending through holes 72 of plate 26 and the respective nuts 74. The bracket is held rigidly in place and provides a firm hinge or pivot point for body 20.

The body 20 is held in its vertical or upright position by a latch 80 having a retractable lock 82 operated in the direction to release it by a handle 84 and urged to latched position by an internal spring (not shown). Latch 80 is welded or otherwise rigidly mounted on the side of body 20 in position so that when it is in the upright position, lock 82 extends downwardly over member 44 and retains the body firmly in its upright position.

In the operation of the present tire carrier, the tire and wheel are mounted on the carrier by extending stud 54 through the center of the wheel and stud 52 through one of the holes for the wheel studs. The plate 56 is then assembled on stud 54 and the two nuts 58 and 60 tightened in place on the respective studs. Body 20 is normally held in its upright position with lock 82 extending downwardly over the upped end of member 44, which, in effect, forms a lug, shoulder or bar for receiving the lock. The lock is tapered on the side facing base 22 so that when the body is pivoted from its horizontal to its vertical position, the lock will automatically pass over member 44 and seat on the opposite side thereof in the manner illustrated in FIGURE 3.

When it is desired to open the door of the rear compartment of the trailer, the operator merely lifts lock 82 from member 44 by lifting handle 84 sufficiently to permit the lock to pass over the top of member 44, thus permitting the body to pivot downwardly on hinge 28 from its vertical position shown in FIGURES 1 and 3 to its horizontal position shown in FIGURE 4. When the body is pivoted to its lowered position, it may be in horizontal position or beyond horizontal position, depending upon the size of the tire and the distance of the lower side of the vehicle from the ground or pavement. A lug or stop means may be provided if desired to limit the downward pivoting of the body; however, normally no adverse effect results from permitting the tire to rest directly on the ground when it is in its lowered position. When the compartment door has been closed, the carrier is returned to its upright position by the operator lifting the tire and pivoting body 20 until lock 82 passes over member 44 and latches the body in its upright position. The carrier remains in this position throughout the time the vehicle is traveling.

While only one embodiment of the present invention has been described in detail herein, various changes and modifications may be made to satisfy requirements.

I claim:

A spare tire carrier for a trailer having a support member, comprising a base for mounting on said support member and projecting outwardly therefrom, a body pivotable between a raised position and a lowered position for supporting a tire, said body being an elongated member standing in an upright position when in its raised position and lying in a substantially horizontal position when in its lowered position, a hinge means connecting said body to said base at the lower end thereof, a latch means for releasably holding said body in its raised position and having a member secured to said base at the top thereof and a lock engaging said member and automatically latching said body in upright position when the body is raised, and a tire mounting means joined to the rear side of said body for supporting a tire and wheel on said carrier and consisting of an upper member attached to the top of said body, a lower member joined to the rear side of said body, and a vertical member attached to said upper and lower members and spaced from said rear side, said lock being mounted on said body on the side thereof opposite said tire mounting means and slidable downwardly longitudinally of the body when the body is in a raised position into engagement with the latch member on said base.

References Cited

UNITED STATES PATENTS

| 1,689,149 | 10/1928 | McCloud | 214—454 |
| 1,779,662 | 10/1930 | Cleland | 224—42.08 |
| 2,553,686 | 5/1951 | Stromberg | 214—42.21 |
| 2,805,807 | 9/1957 | Slack | 224—42.24 X |

FOREIGN PATENTS

| 36,316 | 2/1930 | France. |
| 1,035,168 | 4/1953 | France. |
| 1,055,703 | 10/1953 | France. |

GERALD M. FORLENZA, *Primary Examiner.*

F. E. WERNER, *Assistant Examiner.*